US006757236B1

(12) United States Patent
Kanada

(10) Patent No.: US 6,757,236 B1
(45) Date of Patent: Jun. 29, 2004

(54) OBJECTIVE LENS DRIVING DEVICE WITH FOCUSING COILS AND A TRACKING COIL, AND OPTICAL DISC APPARATUS

(75) Inventor: Tokio Kanada, Kanagawa (JP)

(73) Assignee: Sony Corporation, Tokyo (JP)

( * ) Notice: Subject to any disclaimer, the term of this patent is extended or adjusted under 35 U.S.C. 154(b) by 132 days.

(21) Appl. No.: 09/591,164

(22) Filed: Jun. 9, 2000

(30) Foreign Application Priority Data

Jun. 11, 1999 (JP) .......................................... P11-164854

(51) Int. Cl.[7] ............................................ G11B 17/00
(52) U.S. Cl. ..................................................... 369/244
(58) Field of Search ................................ 369/244, 247, 369/248, 263, 251, 44.1, 44.15; 359/814, 819, 823, 824

(56) References Cited

U.S. PATENT DOCUMENTS

| 4,792,935 A | | 12/1988 | Kime et al. | |
|---|---|---|---|---|
| 5,046,820 A | * | 9/1991 | Saekusa et al. | 359/814 |
| 5,216,648 A | * | 6/1993 | Noda et al. | 369/44.14 |
| 5,408,451 A | * | 4/1995 | Noda et al. | 369/44.15 |
| 5,485,445 A | | 1/1996 | Oinoue et al. | 369/56 |
| 5,523,891 A | * | 6/1996 | Fujisawa | 359/813 |
| 5,583,834 A | | 12/1996 | Kanada et al. | 369/13 |
| 5,617,256 A | * | 4/1997 | Mitsumori et al. | 359/814 |
| 5,638,351 A | | 6/1997 | Kanada et al. | 369/77.2 |
| 5,646,789 A | * | 7/1997 | Lee | 359/814 |
| 5,657,172 A | | 8/1997 | Shibata et al. | |
| 5,666,235 A | | 9/1997 | Izuka | |
| 5,687,033 A | * | 11/1997 | Futagawa et al. | 359/824 |
| 5,761,183 A | * | 6/1998 | Ikegame | 369/220 |
| 5,768,237 A | | 6/1998 | Kanada et al. | 369/75.1 |
| 5,835,475 A | | 11/1998 | Kawakami et al. | 369/112 |
| 5,933,405 A | * | 8/1999 | Song | 369/244 |
| 5,949,590 A | * | 9/1999 | Hong | 359/814 |
| 6,031,812 A | * | 2/2000 | Liou | 369/244 |
| 6,034,940 A | * | 3/2000 | Lee | 369/244 |
| 6,181,670 B1 | * | 1/2001 | Nagasato | 369/244 |
| 6,278,669 B1 | * | 8/2001 | Anzai et al. | 369/44.14 |
| 6,344,936 B1 | * | 2/2002 | Santo et al. | 359/824 |

FOREIGN PATENT DOCUMENTS

| EP | 0 419 097 A2 | 3/1991 |
|---|---|---|
| EP | 0 825 594 A2 | 2/1998 |
| EP | 0 902 423 A2 | 3/1999 |

* cited by examiner

*Primary Examiner*—David Davis
(74) *Attorney, Agent, or Firm*—Oblon, Spivak, McClelland, Maier & Neustadt, P.C.

(57) ABSTRACT

An objective lens driving device in which an objective lens is driven by a magnetic circuit having a focusing coil and a tracking coil. The objective lens driving device is provided with a biaxial movable body that is supported by a support shaft so as to be slidable in the axial direction of the support shaft and rotatable about the support shaft, an objective lens held by the biaxial movable body, a plurality of focusing coils that are provided on the biaxial movable body so as to be symmetrical with respect to the support shaft, a tracking coil or coils that are provided on the biaxial movable body in a number that is smaller than the number of focusing coils, and magnets that are opposed to the focusing coils and the tracking coil or coils, respectively. A plurality of first magnetic circuits are formed by the focusing coils and part of the magnets that are opposed to the respective focusing coils. A second magnetic circuit or circuits are formed by the tracking coil or coils and the other magnet or magnets that are opposed to the tracking coil or coils, respectively, in a number that is smaller than the number of first magnetic circuits. This configuration enables miniaturization of the main body.

8 Claims, 6 Drawing Sheets

PRIOR ART

OBJECTIVE LENS DRIVING DEVICE WITH FOCUSING COILS AND A TRACKING COIL, AND OPTICAL DISC APPARATUS

BACKGROUND OF THE INVENTION

1. Field of the Invention

The present invention relates to an objective lens driving device. More specifically, the invention relates to a technical field of an objective lens driving device that performs a focusing adjustment and a tracking adjustment on an objective lens by moving a biaxial movable body with respect to a recording medium such as an optical disc.

2. Description of the Related Art

Optical disc apparatuses capable of recording and/or reproducing a signal on and/or from an optical disc are known. These optical disc apparatuses are equipped with an objective lens driving device that performs a focusing adjustment and a tracking adjustment on an objective lens by moving a biaxial movable body with respect to a recording medium such as an optical disc.

FIG. 1 shows an example of such a conventional objective lens driving device.

The objective lens driving device a has a biaxial movable body b and four magnetic circuits c and d.

The biaxial movable body b is configured in such a manner that a portion e to be supported and a lens holding portion f that projects from the portion e in one direction are formed integrally with each other. The central portion of the portion e is supported by a support shaft g so as to be slidable in its axial direction and rotatable about the axis. Two focusing coils h are provided on the outer periphery of the portion e so as to be opposed to each other with the support shaft g interposed in between, and two tracking coils i are similarly provided on the outer periphery of the portion e to be supported so as to be opposed to each other with the support shaft g interposed in between. The focusing coils h and the tracking coils i are arranged alternately.

An objective lens j is held on the top surface of the lens holding portion f.

Magnets k are disposed so as to be opposed to the focusing coils h and the tracking coils i, respectively. The magnets k are attached to respective yoke pieces 1.

The focusing coils h, the two magnets k, the two yoke pieces 1, and neutral iron pieces (not shown) that are provided to occupy central portions of the respective focusing coils h constitute two first magnetic circuits c, which move the biaxial movable body b in the axial direction of the support shaft g and thereby perform a focusing adjustment on the objective lens j with respect to the optical disc.

The tracking coils i, the two magnets k, the two yoke pieces 1, and neutral iron pieces (not shown) that are provided to occupy central portions of the respective tracking coils i constitute two second magnetic circuits d, which move the biaxial movable body b about the axis of the support shaft g and thereby perform a tracking adjustment on the objective lens j with respective to the optical disc.

However, the above conventional objective lens driving device a is equipped with the two first magnetic circuits c for the focusing adjustment and the two second magnetic circuits d for the tracking adjustment, that is, the four magnetic circuits c and d in total. Since the magnetic circuits c and d need to be disposed outside the biaxial movable body b, the objective lens driving device a becomes larger when the number of magnetic circuits is larger.

Further, the number of parts that constitute the objective lens driving device increases in proportion to the number of magnetic circuits, causing increase in manufacturing cost.

SUMMARY OF THE INVENTION

An object of the present invention is to solve the above problems.

To attain the above object, the invention provides an objective lens driving comprising a biaxial movable body that is supported by a support shaft so as to be slidable in an axial direction of the support shaft and rotatable about the support shaft; an objective lens held by the biaxial movable body; a plurality of focusing coils that are provided on the biaxial movable body so as to be symmetrical with respect to the support shaft; a tracking coil or coils that are provided on the biaxial movable body in a number that is smaller than the number of focusing coils; and magnets that are opposed to the focusing coils and the tracking coil or coils, respectively, wherein a plurality of first magnetic circuits are formed by the focusing coils and part of the magnets that are opposed to the respective focusing coils; and second magnetic circuit or circuits are formed by the tracking coil or coils and the other magnet or magnets that are opposed to the tracking coil or coils, respectively, in a number that is smaller than the number of first magnetic circuits. The objective lens is driven by the magnetic circuits having the above focusing coils and tracking coil or coils.

DESCRIPTION OF THE PREFERRED EMBODIMENT

An embodiment of an objective lens driving device according to the present invention will be hereinafter described with reference to the accompanying drawings. The following embodiment is such that the invention is applied to an objective lens driving device used in an optical disc apparatus capable of performing recording and/or reproduction on an optical disc that is approximately 64 mm in diameter.

Figure 1:
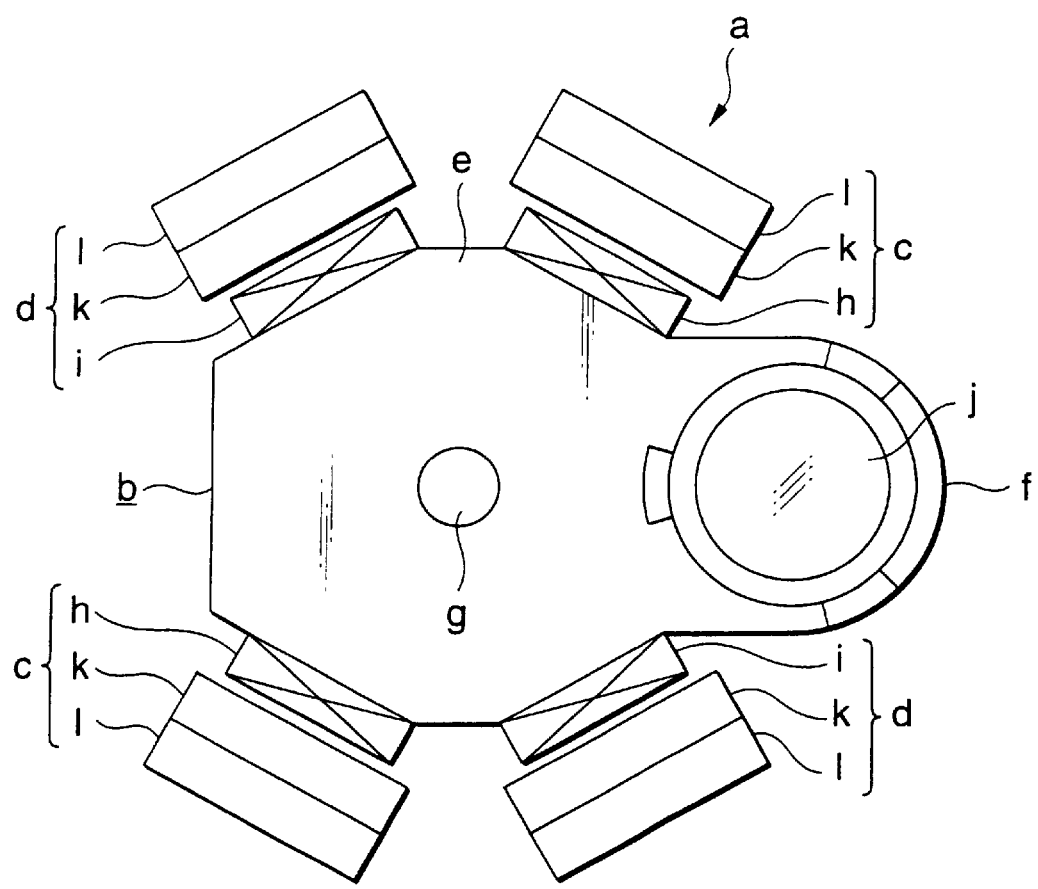
FIG. 1 is an enlarged plan view of a conventional objective lens driving device.
Figure 2:
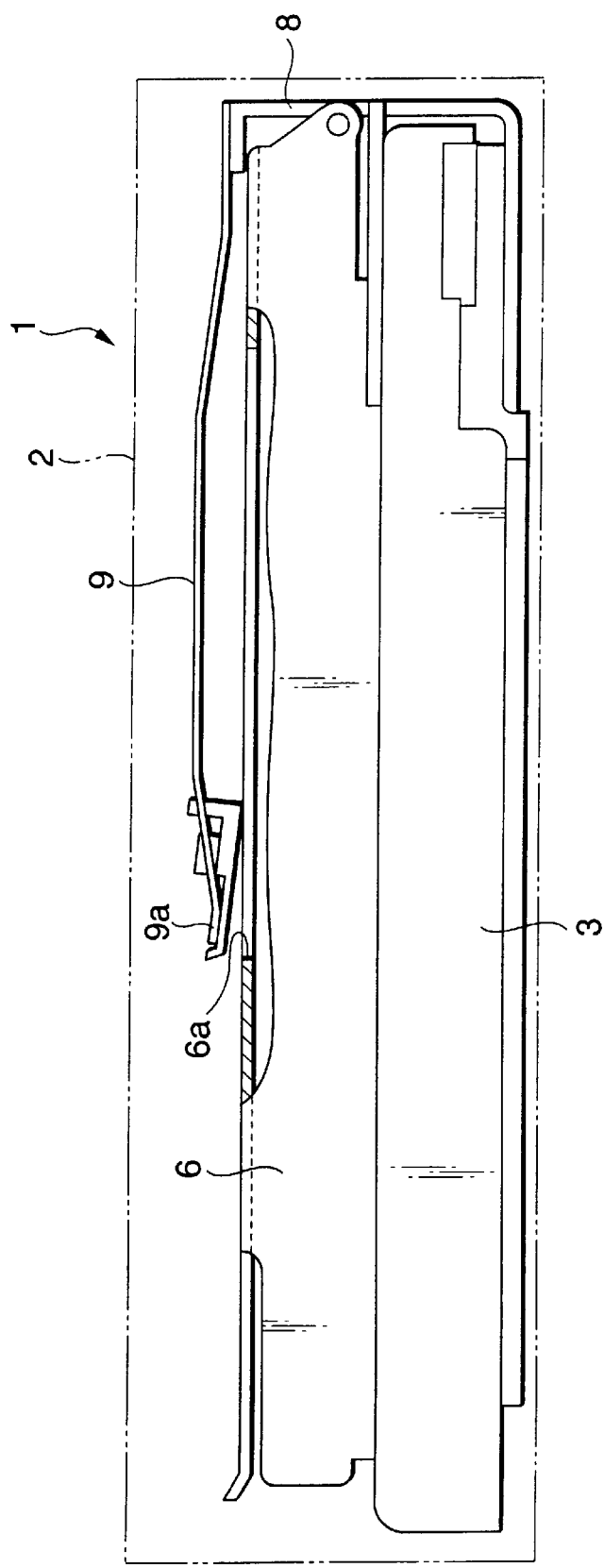
FIG. 2 is a sectional view of an optical disc apparatus according to an embodiment of the present invention.
Figure 3:
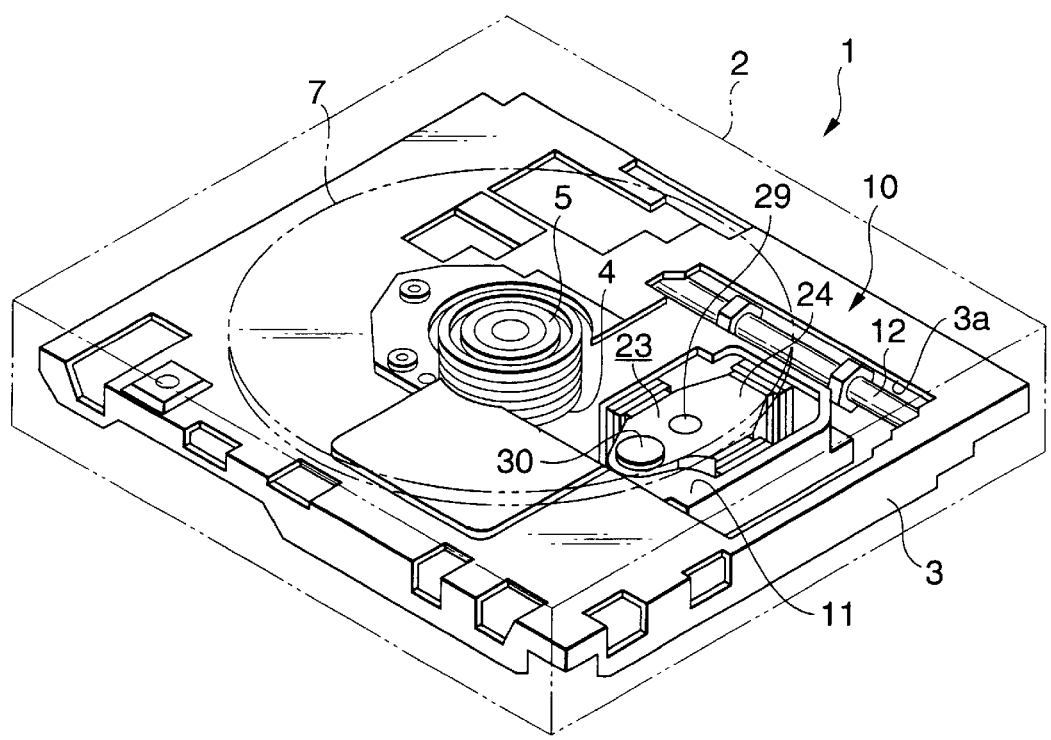
FIG. 3 is a perspective view of the optical disc apparatus of FIG. 2.

As shown in FIGS. 2 and 3, an optical disc apparatus 1 is configured in such a manner that necessary members are arranged in an outer chassis 2. A mechanics chassis 3 is provided in the outer chassis 2 and an arrangement hole 3a is formed in the mechanics chassis 3 at a prescribed position as shown in FIG. 3.

A spindle motor 4 is provided in the mechanics chassis 3 at a lower, central position and a disc table 5 is fixed to the motor shaft of the spindle motor 4. As shown in FIG. 3, the disc table 5 projects upward from the mechanics chassis 3 through the arrangement hole 3a.

As shown in FIG. 2, a holder 6 is supported by the mechanics chassis 3 so as to be rotatable with its rear end portion as a supporting point and a hole 6a is formed in the top plate of the holder 6 at a prescribed position. The holder 6 is to hold a disc cartridge to be inserted into the outer chassis 2. The disc cartridge is configured in such a manner that an optical disc 7 of approximately 64 mm in diameter can be accommodated rotatably in a cartridge (not shown).

When the holder 6 is turned to the side where it is brought into contact with the mechanics chassis 3 in a state that the disc cartridge is held by the holder 6, the optical disc 7 is mounted on the disc table 5 and is allowed to rotate as the disc table 5 is rotated by the spindle motor 4.

As shown in FIG. 2, a head joint lever 8 is movably supported by the mechanics chassis 3 on its rear end side. An overhead 9 is supported by the joint lever 8 at its top end portion so as to be rotatable with the rear end portion of the overhead 9 as a supporting point. A head portion 9a is provided at the tip portion of the overhead 9.

The heat portion 9a of the overhead 9 is elevated and lowered by an elevation mechanism (not shown). When a recording operation is performed on the optical disc 7, the head portion 9a is brought into sliding contact with the rotating optical disc 7 through the hole 6a of the holder 6. When a reproducing operation is performed on the optical disc 7, the head portion 9a is not lowered and instead it is held above the holder 6.

Figure 4:
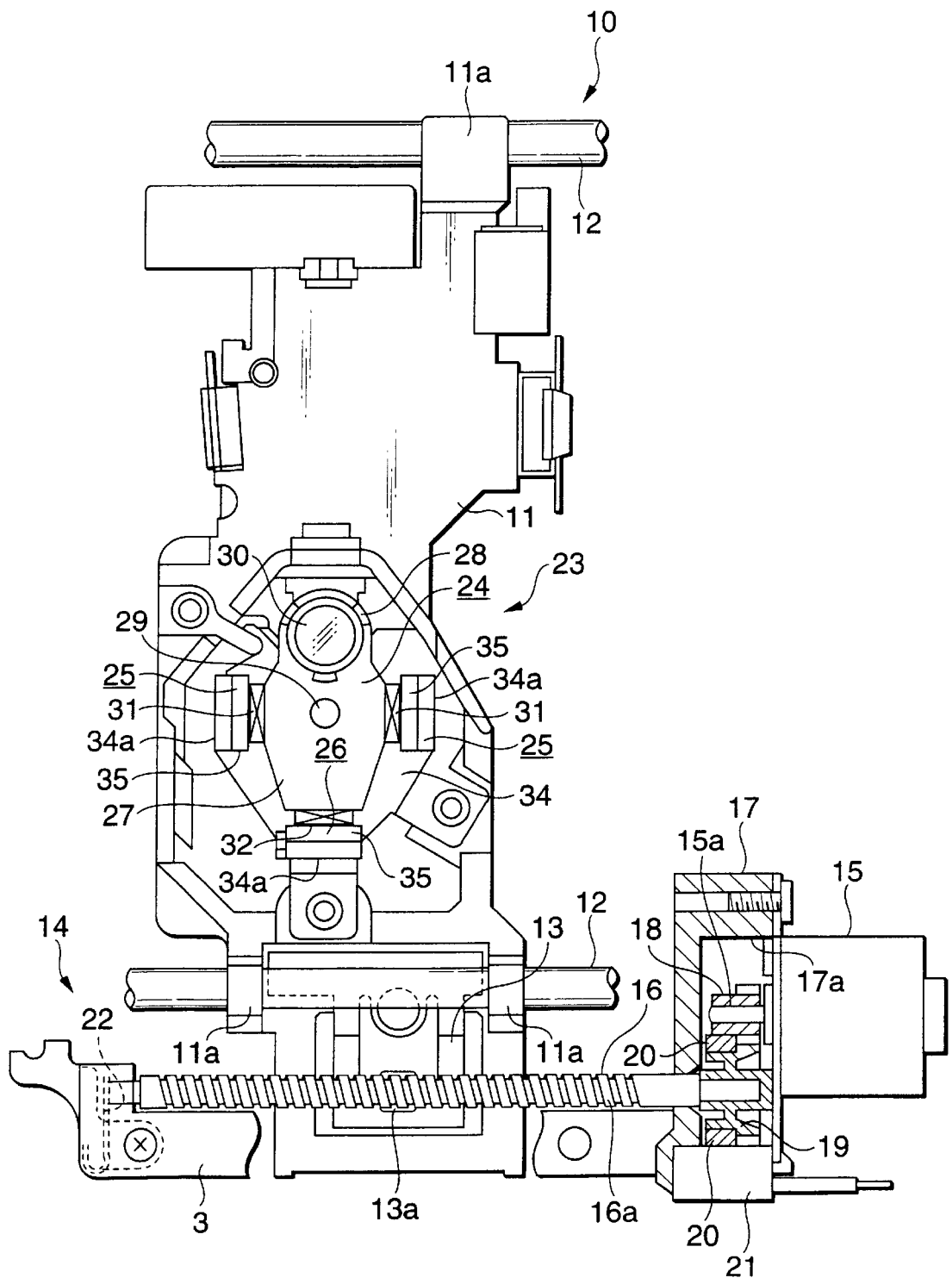
FIG. 4 is an enlarged plan view of an optical pickup according to the embodiment of the invention.

As shown in FIGS. 3 and 4, an optical pickup 10 is supported by the mechanics chassis 3 at a lower position that corresponds to the arrangement hole 3a so as to be movable in the radial direction of the optical disc 7 that is mounted on the disc table 5.

The optical pickup 10 is configured in such a manner that necessary members are arranged on a movable base 11. Bearing portions 11a are provided at both ends of the movable base 11. Guide shafts 12 are inserted in the respective bearing portions 11a, whereby the movable base 11 is made slidable in the axial direction of the guide shafts 12. As shown in FIG. 2, the overhead 9 is connected to the movable base 11 via the above-mentioned head joint lever 8, whereby the overhead 9 is moved as the optical pickup 10 is moved.

A leaf spring member 13 is attached to one end portion of the movable base 11. The leaf spring member 13 is formed with an engagement portion 13a (punched upward) at a prescribed position. The movable base 11 is fed in a prescribed direction by a feeding mechanism 14.

As shown in FIG. 4, the feeding mechanism 14 has a motor 15, a feed screw 16, and the above-mentioned guide shafts 12. The motor 15 is attached to an attachment portion 17 and a motor shaft 15a is located in an inside space 17a of the attachment portion 17.

Gears 18 and 19 that mesh with each other are provided in the inside space 17a of the attachment portion 17 and the motor shaft 15a of the motor 15 is fixed to the gear 18. Encoders 20 made of a magnetic material are attached to the gear 19 at prescribed positions. A sensor 21 is attached to one end portion of the attachment portion 17 so as to have a prescribed distance from the encoders 20. The sensor 21 magnetically detects the encoders 20. The motor 15 is controlled based on the magnetic detection by the sensor 21.

One end portion of the feed screw 16 is fixed to the gear 19 and the other end face is in resilient contact with the mechanics chassis 3 in the axial direction by means of a pre-load spring 22 that is attached to the mechanics chassis 3 at a prescribed position.

The engagement portion 13a of the leaf spring member 13 is threadedly engaged with the thread groove 16a of the feed screw 16. When the feed screw 16 is rotated by drive force of the motor 15 via the gears 18 and 19, the movable base 11 is fed via the engagement portion 13a, whereby the optical pickup 10 is moved in the radial direction of the optical disc 7 that is mounted on the disc table 5. The optical pickup 10 is moved in a direction corresponding to a rotation direction of the motor 15.

Figure 5:
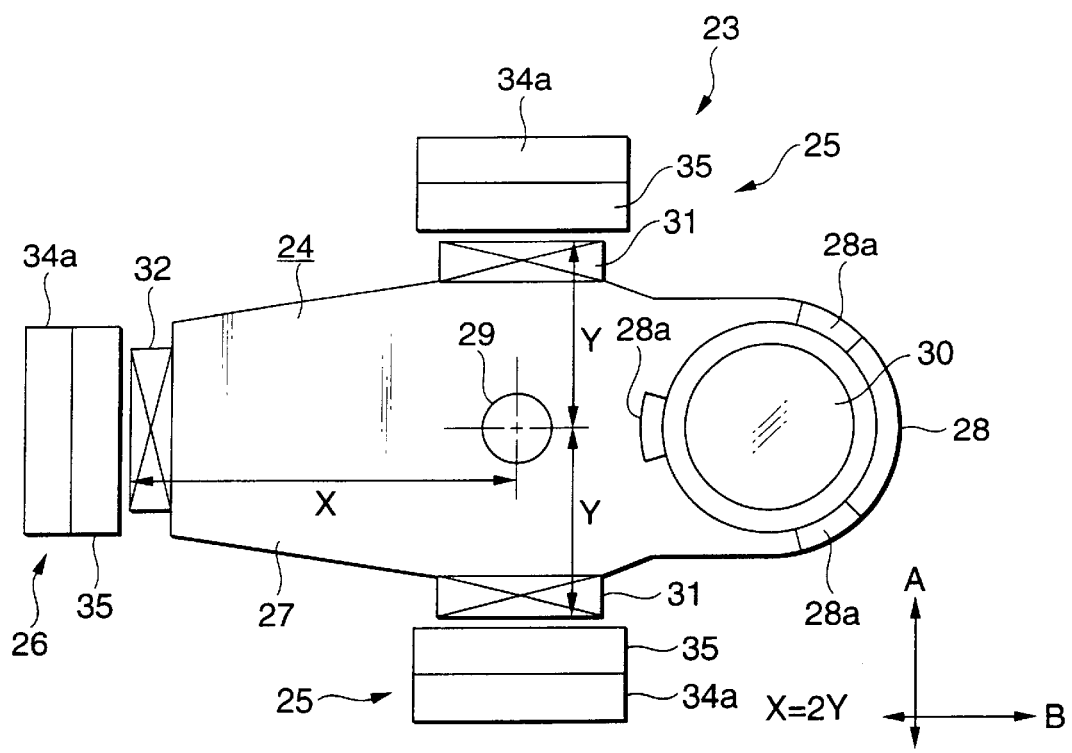
FIG. 5 is an enlarged plan view of an objective lens driving device according to the embodiment of the invention.
Figure 6:
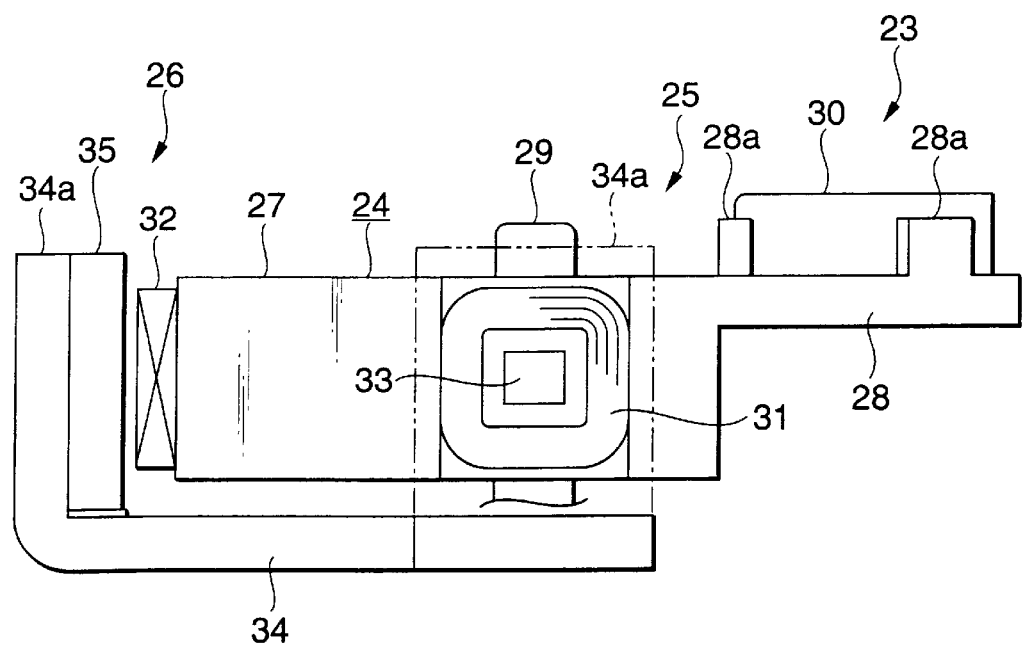
FIG. 6 is an enlarged side view of the objective lens driving device of FIG. 5.

As shown in FIGS. 4–6, an objective lens driving device 23 is provided on the movable case 11 and has a biaxial movable body 24 and three magnetic circuits 25, 25, and 26.

The biaxial movable body 24 is configured in such a manner that a portion 27 to be supported and a lens holding portion 28 that projects from the portion 27 in one direction are formed integrally with each other. The central portion of the portion 27 is supported by a support shaft 29 (provided on the movable base 11) so as to be slidable in its axial direction and rotatable about the axis.

Three short-arc-shaped holding projections 28a that are spaced from each other in the circumferential direction project from the lens holding portion 28. An objective lens 30 is held by the lens holding portion 28 in a state that it is fitted in the holding projections 28a.

A pair of focusing coils 31 is provided on the outer periphery of the portion 27 to be supported. As shown in FIG. 5, the focusing coils 31 are spaced from each other in direction A that is perpendicular to direction B connecting the center of the support shaft 29 and the center of the objective lens 30. As shown in FIG. 5, the distances from the center of the support shaft 29 to the outside ends of the respective focusing coils 31 are the same distance Y.

A tracking coil 32 is provided at an end position of the portion 27 to be supported that is on the side opposite to the side where the objective lens 30 is provided. The tracking coil 32 and the objective lens 30 are located on the opposite sides of the support shaft 29 in direction B that is perpendicular to direction A on which the focusing coils 31 are located. As shown in FIG. 5, the distance X from the center of the support shaft 29 to the outside end of the tracking coil 32 is two times the distance Y from the center of the support shaft 29 to the outer ends of the focusing coils 31.

As partially shown in FIG. 6, neutral iron pieces 33 are provided to occupy central portions of the focusing coils 31 and the tracking coil 32, respectively.

A base member 34 is provided on the movable base 11 under the biaxial movable body 24 and three yoke pieces 34a erect from the outer periphery of the base member 34 as shown in FIGS. 4 and 5. Three magnets 35 are fixed to the inside surfaces of the respective yoke pieces 34a. The magnets 35 are opposed to the focusing coils 31 and the tracking coil 32, respectively.

The focusing coils 31, the two neutral iron pieces 33, the two yoke pieces 34a, and the two magnets 35 constitute two first magnetic circuits 25, which move the biaxial movable body 24 in the axial direction of the support shaft 29 and thereby perform a focusing adjustment on the objective lens 30 with respect to the optical disc 7.

The tracking coil 32, the one neutral iron piece 33, the one yoke piece 34a, and the one magnet 35 constitute a second magnetic circuit 26, which moves the biaxial body 24 about the axis of the support shaft 29 and thereby performs a tracking adjustment on the objective lens 30 with respect to the optical disc 7. The first magnetic circuits 25 and the second magnetic circuit 26 exert the same drive force on the biaxial movable body 24.

Although the first magnetic circuits 25 and the second magnetic circuit 26 exert the same drive force on the biaxial movable body 24, the only one second magnetic circuit 26 is provided in the objective lens driving device 23 whereas the two first magnetic circuits 25 are provided there.

Therefore, if the distance from the center of the support shaft 29 to the focusing coils 31 were set equal to the distance from the center of the support shaft 29 to the tracking coil 32, the sensitivity in the tracking direction would be a half of the sensitivity in the focusing direction. However, in the objective lens driving device 23, since the distance X from the center of the support shaft 29 to the tracking coil 32 is two times the distance Y from the center of the support shaft 29 to the focusing coils 31, the moment is doubled and hence the sensitivity in the tracking direction is made the same as that in the focusing direction. Therefore, although only the single tracking coil 32 is provided, the focusing adjustment and the tracking adjustment can be performed properly.

Next, the operation of the optical disc apparatus 1 according to the invention will be described. When the optical disc 7 is mounted on the disc table 5 and a manipulation button (not shown) of the optical disc apparatus 1 is manipulated, the optical disc 7 is rotated as the disc table 5 is rotated by the spindle motor 4.

When the optical disc 7 is rotated, the motor 15 is rotated to rotate the feed screw 16, whereby the optical pickup 10 is moved from the inner side of the optical disc 7 to its outer side. At the same time, a laser beam emitted from a light source (not shown) is applied to a recording track of the optical disc 7 through the objective lens 30 of the objective lend driving device 23, whereby data is recorded on or reproduced from the optical disc 7. As described above, when a data recording operation is performed on the optical disc 7, the head portion 9a of the overhead 9 is brought into sliding contact with the rotating optical disc 7.

During data recording or reproduction on the optical disc 7, adjustments are so made that the spot of a laser beam being applied through the objective lens 30 has a proper diameter and follows the recording track of the optical disc 7. More specifically, the focusing adjustment is performed in such a manner that the biaxial movable body 24 is moved in the axial direction of the support shaft 29 by the first magnetic circuits 25 and the tracking adjustment is performed in such a manner that the biaxial movable body 24 is moved about the axis of the support shaft 29 by the second magnetic circuit.

As described above, in the objective lens driving device 23, since the tracking adjustment is performed properly by providing only the single tracking coil 32, the objective lens driving device 23 can be miniaturized and the number of its parts can be reduced so much as the number of tracking coils 32 is reduced.

The above embodiment is such that all of the first magnetic circuits 25 and the second magnetic circuit 26 exert the same drive force on the biaxial movable body 24. As long as the focusing adjustment and the tracking adjustment can be performed properly, the first magnetic circuits 25 and the second magnetic circuit 26 may exert different drive forces on the biaxial movable body 24.

Although in the embodiment the two focusing coils 31 and the one tracking coil 32 are provided, three or more focusing coils 31 may be provided to increase the drive force. In this case, satisfactory results are obtained by making the number of tracking coils 32 smaller than that of focusing coils 31. Adjusting the distances between the individual coils and the support shaft 29 makes it is possible to equalize the sensitivities in the focusing direction and the tracking direction.

Desired sensitivities can be set in the focusing direction and the tracking direction by correcting a difference between the sensitivities in the focusing direction and the tracking direction by making the distance X from the center of the support shaft 29 to the tracking coil 32 different from the distance Y from the center of the support shaft 29 to the focusing coils 31.

All of the specific shapes and structures of the individual portions described in the above embodiment are just examples of embodying in practicing the invention, and they should not be used to interpret the technical scope of the invention in a limitative manner.

According to the embodiment of the invention, the objective lens driving device can be miniaturized and the number of its parts can be reduced so much as the number of tracking coils is reduced.

In the embodiment of the invention, the distance from the center of the support shaft to the tracking coil is made different from the distance from the center of the support shaft to the focusing coils. Therefore, desired sensitivities can be set in the focusing direction and the tracking direction by correcting a difference between the sensitivities in the focusing direction and the tracking direction.

In embodiment of the invention, the first magnetic circuits and the second magnetic circuit exert the same drive force on the biaxial movable body, and the distance from the center of the support shaft to the tracking coil is made two times the distance from the center of the support shaft to the focusing coils. Therefore, the sensitivity in the tracking direction is made the same as that in the focusing direction, whereby the focusing adjustment and the tracking adjustment can be performed properly though only one tracking coil is provided.

What is claimed is:

1. An objective lens driving device, comprising:

a biaxial movable body that is supported by a support shaft so as to be slidable in an axial direction of the support shaft and rotatable about the support shaft;

an objective lens held by the biaxial movable body at a first end of the biaxial movable body;

a plurality of focusing coils that are provided on sides of the biaxial movable body so as to be symmetrical with respect to the support shaft;

at least one tracking coil provided on the biaxial movable body at a second end of the biaxial movable body opposite to the first end holding the objective lens, the plurality of focusing coils being greater in number than the at least one tracking coil and a distance between a center of the support shaft and the at least one tracking coil is twice the value of a distance between the center of the support shaft and the plurality of focusing coils; and at least one magnet in opposing relation to each of the focusing coils and the at least one tracking coil, respectively, wherein:

a plurality of first magnetic circuits are formed by each of the focusing coils and corresponding ones of the plurality of magnets that are opposed to the respective focusing coils; and at least one second magnetic circuit is formed by the at least one tracking coil and a corresponding one of the plurality of magnets opposed to the at least one tracking coil, respectively.

2. The objective lens driving device according to claim 1, wherein the plurality of the first magnetic circuits and the at least one second magnet circuit drive the biaxial movable body by drive forces which are approximately equal in value.

3. The objective lens driving device according to claim 1, wherein the center of the support shaft and the at least one tracking coil are separated by a distance so that a moment of the focusing coils acting on the biaxial movable body, the moment being determined by the number of focusing coils and the distance between the center of the support shaft and the individual focusing coils, is approximately equal to a moment of the at least one tracking coil acting on the biaxial moveable body.

4. An objective lens driving device, comprising:
a biaxial movable body that is supported by a support shaft so as to be slidable in an axial direction of the support shaft and rotatable about the support shaft;
an objective lens held by the biaxial movable body at a first end of the biaxial movable body;
a pair of focusing coils that are provided on side ends of the biaxial movable body so as to be opposed to each other with the support shaft interposed therebetween;
a tracking coil provided on the biaxial movable body at a second end of the biaxial movable body opposite to the first end holding the objective lens, and wherein a distance between a center of the support shaft and the tracking coil is twice the value of a distance between the center of the support shaft and the pair of focusing coils; and
at least one magnet in opposing relation to each focusing coil of the pair of focusing coils and tracking coil, respectively, wherein:
a pair of first magnetic circuits are formed by each of the focusing coils and corresponding ones of the plurality of magnets that are opposed to the respective focusing coils; and
a second magnetic circuit is formed by the tracking coil and a corresponding one of the plurality of magnets opposed to the tracking coil.

5. The objective lens driving device according to claim 4, wherein the first magnetic circuits and the second magnetic circuit drive the biaxial movable body by drive forces which are approximately equal in value.

6. The objective lens driving device according to claim 4, wherein the first magnetic circuits and the second magnetic circuit drive the biaxial movable body by approximately the same drive force value.

7. An optical disc apparatus capable of reading out a signal recorded on an optical disc, the optical disc apparatus comprising:
an optical pickup adapted to be movable in a radial direction of an optical disc;
a biaxial movable body that is supported by a support shaft of the optical pick up so as to be slidable in an axial direction of the support shaft and rotatable about the support shaft;
an objective lens held by the biaxial movable body at a first end of the biaxial movable body;
a plurality of focusing coils that are provided on sides of the biaxial movable body so as to be symmetrical with respect to the support shaft;
at least one tracking coil provided on the biaxial movable body at a second end of the biaxial movable body opposite to the first end holding the objective lens, the plurality of focusing coils being greater in number than at least one tracking coil and a distance between a center of the support shaft and at least one tracking coil is twice the value of a distance between the center of the support shaft and the plurality of focusing coils; and
at least one magnet in opposing relation to each of the focusing coils and the at least one tracking coil, respectively, wherein:
a plurality of first magnetic circuits are formed by each of the focusing coils and corresponding ones of the plurality of magnets that are opposed to the respective focusing coils; and
at least one second magnetic circuit is formed by the at least one tracking coil and a corresponding one of the plurality of magnets opposed to the at least one tracking coil, respectively.

8. An objective lens driving device, comprising:
a biaxial movable body that is supported by a support shaft so as to be slidable in an axial direction of the support shaft and rotatable about the support shaft;
an objective lens held by the biaxial movable body;
a pair of focusing coils that are provided on the biaxial movable body so as to be opposed to each other with the support shaft interposed therebetween;
a tracking coil provided on the biaxial movable body such that a distance between a center of the support shaft and the tracking coil is greater than a distance between the center of the support shaft and the pair of focusing coils; and
at least one magnet in opposing relation to each focusing coil of the pair of focusing coils and tracking coil, respectively, wherein:
a pair of first magnetic circuits are formed by each of the focusing coils and corresponding ones of the plurality of magnets that are opposed to the respective focusing coils;
a second magnetic circuit is formed by the tracking coil and a corresponding one of the plurality of magnets opposed to the tracking coil; and
the first magnetic circuits and the second magnetic circuit drive the biaxial movable body by approximately the same drive force value, and wherein the distance between a center of the support shaft and the tracking coil is twice the value of a distance between the center of the support shaft and the focusing coils.

* * * * *